United States Patent [19]

Silver et al.

[11] 4,195,395

[45] Apr. 1, 1980

[54] METHOD OF ROTATABLY SUPPORTING TWO MEMBERS WITH A FOIL BEARING HAVING A STIFFENER

[75] Inventors: Alexander Silver, Tarzana; James R. Wenban, Redondo Beach, both of Calif.

[73] Assignee: The Garrett Corporation, Los Angeles, Calif.

[21] Appl. No.: 858,503

[22] Filed: Dec. 7, 1977

Related U.S. Application Data

[62] Division of Ser. No. 689,620, May 24, 1976, Pat. No. 4,153,315.

[51] Int. Cl.² .............................................. B21D 53/10
[52] U.S. Cl. ........................... 29/149.5 S; 29/149.5 A; 29/149.5 C; 308/9; 308/121
[58] Field of Search ................... 29/149.5 A, 149.5 C, 29/149.5 S; 308/9, 121

[56] References Cited

U.S. PATENT DOCUMENTS

| | | | |
|---|---|---|---|
| 3,635,534 | 1/1972 | Barnett | 308/121 |
| 3,809,443 | 5/1974 | Cherubim | 308/9 |
| 3,893,733 | 7/1975 | Silver et al. | 308/9 |

*Primary Examiner*—Francis S. Husar
*Assistant Examiner*—V. K. Rising
*Attorney, Agent, or Firm*—Joel D. Talcott; Albert J. Miller

[57] ABSTRACT

An improved stiffener element for use in foil journal bearings provides damping of eccentric shaft rotation in two bending modes of operation and also provide greater load capacity and higher speeds for the bearing.

7 Claims, 9 Drawing Figures

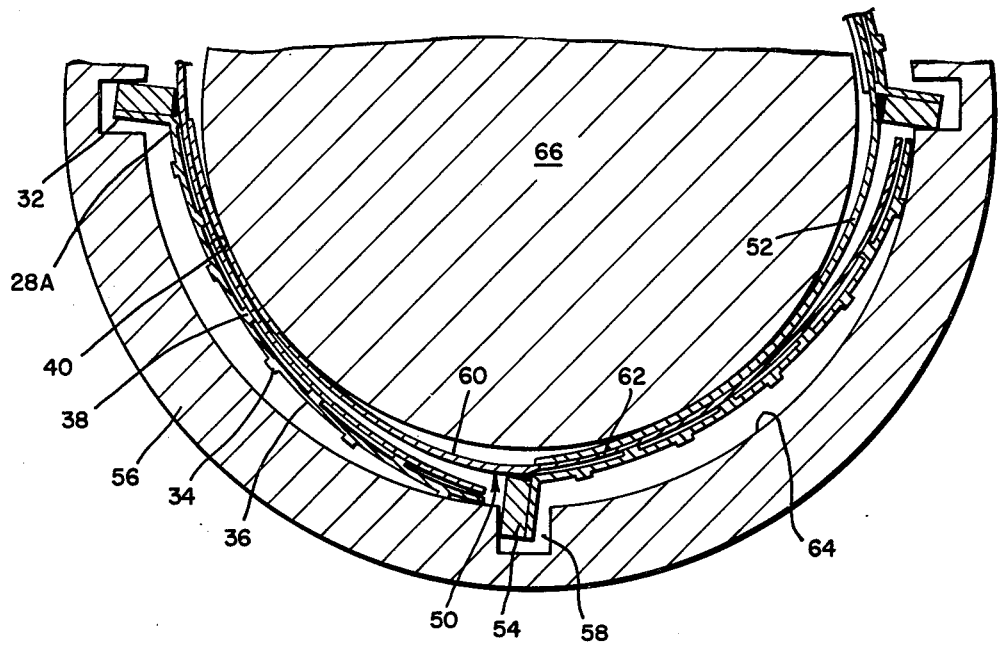
Fig. 8.
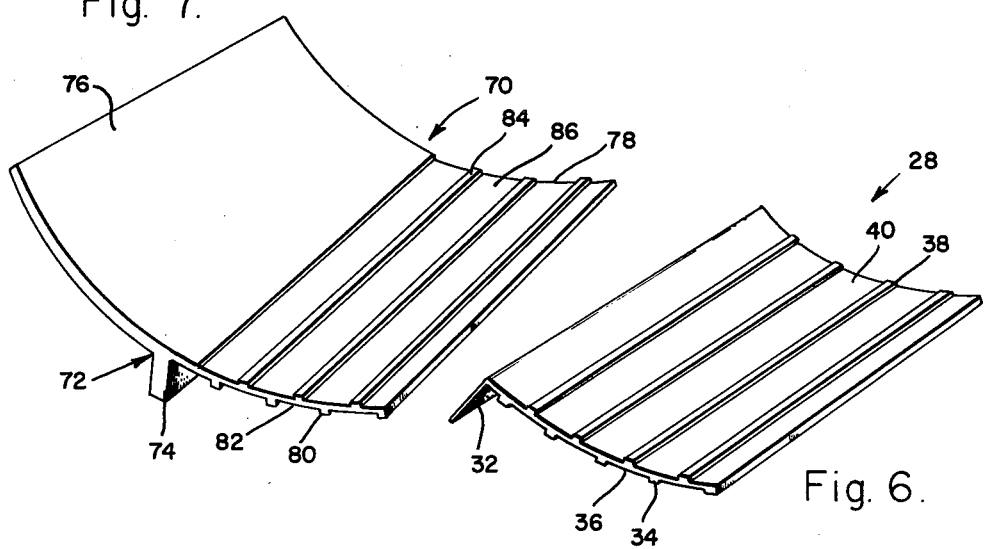
Fig. 7.
Fig. 6.
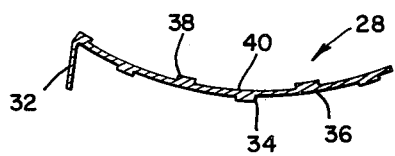
Fig. 5.

METHOD OF ROTATABLY SUPPORTING TWO MEMBERS WITH A FOIL BEARING HAVING A STIFFENER

This is a divisional of application Ser. No. 689,620 filed May 24, 1976 and now U.S. Pat. No. 4,153,315, issued May 8, 1979.

This invention relates generally to self-pressurizing hydrodynamic bearings for providing fluid support between two members movable relative to each other and supported on a thin fluid film. More particularly the invention relates to bending foil type fluid bearings in which means are provided for stiffening the foils to enhance the load carrying capability of the bearing and to provide dampening and cushioning effects between the two members. A detailed background description of self-pressurizing foil bearings is disclosed in U.S. Pat. No. 3,635,534 entitled "Self-Pressurizing Bearings with Resilient Elements."

In resilient foil bearings of this type, the principle difficulties have been limited foil stiffness and oscillatory motions between the movable and stationary member at certain critical bearing speeds. It is a general advantage of foil bearings to have the foil of thin material in order that it may conform to the supported member more uniformly under all conditions. However, the thinner foil is more compliant and thus has a reduced load bearing capacity. In the case of the second problem, due to unbalance, the shaft in a high speed bearing for rotating machines tends to orbit about the geometric center of the bearing support and the amplitude of the oscillation is maximized at certain critical speeds. In order to control this oscillation, it is desirable to have a substantial amount of damping in the bearing assembly.

The present invention overcomes these difficulties by providing a resilient foil support disposed beneath each of the primary foils and in contact with the primary foil intermediate its ends. This has the effect of increasing the total foil stiffness. At the same time, the primary foil may be made of relatively thin material over its entire length so that it will easily conform to the shape of its matching member to provide the optimum fluid bearing under normal operating conditions. To resist oscillation of the bearing shaft at certain critical speeds, the foil supports are so arranged that the primary foil tends to rub along the stiffening member during oscillatory motions. This rubbing action produces Coulomb friction which aids in damping the vibration of the shaft.

Should this oscillatory motion of the shaft or side load become so great that the foils and stiffening elements bend a sufficient amount to conform to the shape of the carrier ring, the stiffener bends in flexure in individual beam segments to provide additional film clearance at a higher spring rate. In this manner, greater load capacity is provided and higher bearing speeds may be obtained without shaft runout causing "bottoming" of the bearing.

The advantages of the improved bearing arrangements of this invention will be more readily understood when the following specification is read in conjunction with the appended drawings, wherein:

FIG. 5 is a sectional view of a stiffening member of this invention;

FIG. 6 is a perspective view of the stiffening member of FIG. 5;

FIG. 7 illustrates an alternate embodiment wherein the stiffening member is combined with a foil member in a single structure;

FIG. 8 illustrates an alternative bearing construction for use of a stiffening member in accordance with this invention.

Figure 1:
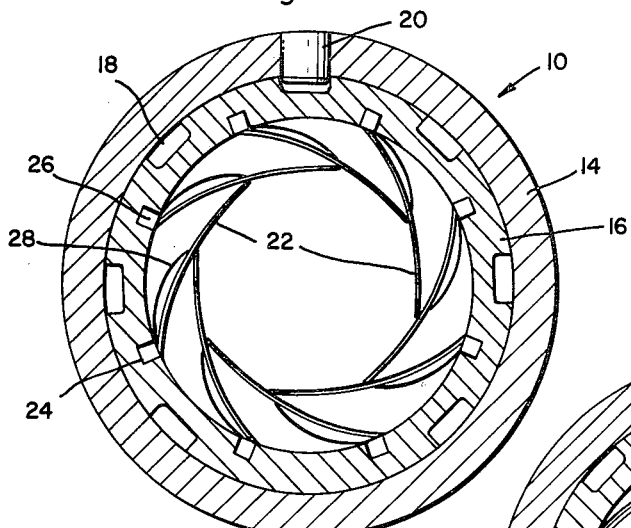
FIG. 1 is a longitudinal sectional view through a bearing of this invention.
Figure 3:
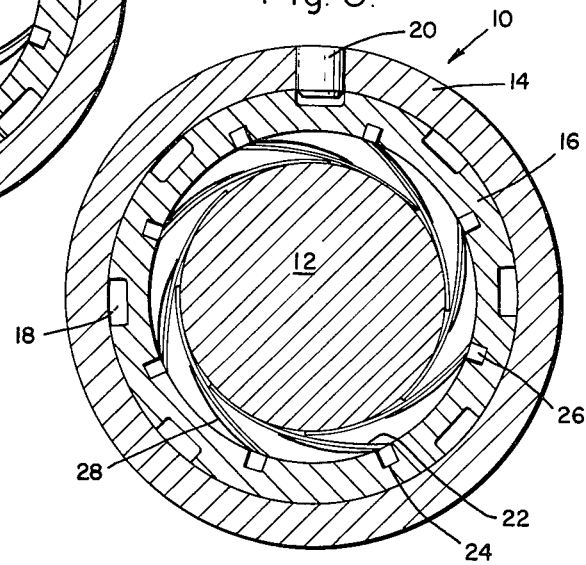
FIG. 3 is a view of the bearing of FIG. 1 including a rotating shaft.

Referring now to the drawings, FIGS. 1 and 3 illustrate a bearing assembly 10 for supporting a rotating shaft 12. The bearing assembly generally comprises a bearing housing ring 14 supporting a concentric foil carrier ring 16. The carrier ring is provided with axial slots 18 which provide passages for cooling air along the axis of the bearing and also provide for axial pressure balancing of the bearing. One of these slots is used in connection with a pin 20 to prevent relative rotation between the housing 14 and the foil carrier 16. The pin 20 extends through the housing member and partially into one of the passages 18 to provide a locking function.

Attached to the inner surface of the carrier ring 16 are a plurality of foils 22 which are seated in axial slots 24 in the carrier ring 16 and retained in the slot by slugs 26. Also held in the slots 24 by the slugs 26 are a plurality of foil support members 28.

As can be seen in FIG. 1, both the foils 22 and foil support members 28 are given an initial curvature larger than that of the shaft 12 and thus provide a pre-loading of the bearing. After the shaft 12 has been inserted, as shown in FIG. 3, bending the foils 22 and supports 28 cause the curvature to more closely approach each other. However, it will be readily understood that oscillation of the shaft will cause somewhat different relative rates of deformation of the foils 22 and foil support members 28 which will cause the free end of the support members to rub on the associated outer surface of the foils 22. This rubbing action will generate Coulomb friction and will aid in damping the oscillation of the shaft.

Damping of the oscillations of the shaft is also provided by the bending action of the foils 22, largely aided by the bending of the foil support members 28 along therewith. This action is described in detail in the aforementioned U.S. Pat. No. 3,635,534 and in U.S. Pat. No. 3,893,733 entitled "Foil Bearing Arrangements." As is described in these patents, interaction of the rotating shaft 12 and the bearing foils 22 causes a layer of air to form therebetween supporting the shaft. Supporting the shaft within this layer of air causes a very low friction bearing to be formed.

Increases in the load to be supported by the bearing or in the speed of rotation of the shaft 12 tends to cause increased shaft run out, a condition wherein the shaft approaches more closely the inner surface of the foil carrier ring 16. This motion of the shaft 12 applies force through the layer of air against the foils 22 which bend in response thereto and rub on each other resulting in a damping of this oscillation, the amount of damping being partly dependent upon the bending spring rate or stiffness of the foil and partly on the friction forces. Thus, by making a stiffer and more damped foil, shaft run out can be more readily controlled without danger that the foil will become "grounded" or flattened against the foil carrier ring so that it is no longer able to respond to the oscillations and damp the motion of the shaft.

Generally, it is desirable to make the foils of relatively thin material to more readily conform to the shape of the shaft and optimize bearing operation. Thus, foil support members or stiffeners have been utilized to provide the higher bending spring rate while permitting the foil itself to be thin.

However, for larger loads or higher operating speeds, the radial displacement may still become so great that the foil 22 and support member 28 become flattened against the inner surface of the foil carrier ring 16. With prior art bearings, operation under such conditions would prevent further yielding of either the foil or support member and cause loss of the air film. Thus, further damping action in response to increased oscillation could not occur and foil and stiffener are "grounded." Any increase in oscillation of the shaft will cause hard impact against the carrier ring which may be highly damaging or, at the very least, will significantly slow shaft rotation.

The foil support member 28 of this invention provides significant improvement over prior art devices in that it is capable of providing local support and shaft damping even under conditions in which prior art stiffeners would have become grounded and unable to function efficiently. The foil support member 28 is best illustrated in FIGS. 5 and 6 and is preferably formed of metallic foil bent to form a foil support mounting portion 32 at one end thereof. The foil support member 28 is bent to a predetermined curvature, larger than the curvature of the foil carrier ring 16 or shaft 12 (see FIG. 1) so as to provide a preloading of the bearing as previously discussed. This curvature should, however, preferably not substantially differ from the curvature of the foils 22.

The convex under surface of support member 28 is preferably etched or grooved to alternately provide flat topped ridges 34 and groove 36. The top surface is also provided with alternate ridges 38 and grooves 40. The grooves 36 and 40 provide useful cooling to the bearings by directing the flow of fluid along the length of the foil. The ridges 34 and 38 are generally flat topped so as to facilitate sliding of the foils thereover and also to minimize waviness in the fluid film surface.

In order to provide a resilient or spring-like structure, the upper surface ridges 38 are opposed to the lower surface grooves 36 while the upper surface grooves 40 are opposed to the lower surface ridges 34. While the grooves and ridges can be accurately and cheaply produced by photochemical etching or machining techniques, alternative methods, such as bonding a plurality of narrow strips to the foil surfaces, may be utilized.

Figure 4:
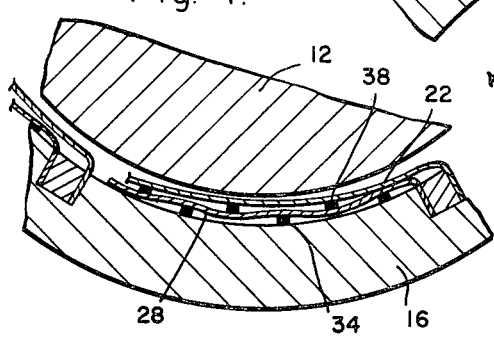
FIG. 4 is an enlarged section of a portion of FIG. 3.

Referring now to FIG. 4, the substantial advantages of the specific configuration of the foil support member 28 of this invention can be seen. In FIG. 4, the bearing is represented in a configuration where, under the influence of either a large load or a high rotational speed or a combination thereof, oscillatory run out of the shaft 12 has increased to such a degree that the foils 22 and foil support members 28 bending throughout their length as a single beam, are forced against the foil carrier ring 16 by the action of the rotating shaft 12. In this configuration, damping can no longer be provided by either the bending action of the foil 22 and foil support member 28 or by the Coulomb friction resulting from interaction of the members. Were a prior art stiffener used under these conditions, the bearing would be grounded.

However, with the foil support member 28 of this invention, the foil 22 is pressed against the ridges 38 on the top surface of the support member while the ridges 34 on the under surface of the support member rest against the foil carrier ring 16. The application of further pressure by the fluid layer between the shaft 12 and foil 22 causes the foil 22 to apply a force against the ridges 38 urging the foil support member to yield in a mode wherein the support member bends in flexure as individual beam segments between ridges so that damping and fluid film clearance continues and bearing operation is not degraded. As will be readily understood, this beam segment bending of the support member 28 has the significantly higher "spring rate" of the short beam segments rather than that exhibited by the longer full beam of the support member when yielding in a full beam bending mode. Thus, effective damping can be provided by the support member which will permit the bearing support much greater loads than could be tolerated by bearings utilizing prior art stiffeners.

In our U.S. patent application Ser. No. 689,619, filed on May 24, 1976 concurrently with U.S. patent application Ser. No. 689,620, of which this application is a divisional, a novel foil bearing structure is illustrated wherein individual compliant foils are mounted intermediate the ends thereof. The use of the foil support member of this invention in such a structure is illustrated in FIG. 8. As described in more detail in the aforementioned application Ser. No. 689,619, each foil bearing element 50 comprises a thin compliant bearing foil 52 having a mounting bar or rod 54 affixed intermediate the ends thereof, for example by spot welding. A plurality of foil bearing elements 50 are adapted to be placed around the interior of a bushing 56 with the mounting bars 54 adapted to fit in grooves or slots 58 in the inner surface of the bushing.

Each bearing foil 52 includes an over foil 60 and an under foil 62 on either side of the mounting bar 54. The under foil 62 on one side of the mounting bar 54 is adapted to be positioned under the over foil 60 on the other side of the mounting bar 54 of the next adjacent bearing foil 52.

When a shaft 66 is inserted into the bushing 56, the compliant bearing foils 52 are compressed into the space between the shaft 66 and bushing 56 such that the under foil 62 provides a resilient support for the over foil 60 of the next adjacent bearing foil 52. The mounting bars 54 are also forced more deeply into the grooves 58 at the inner surface of the bushing 56. Each foil 52 acts as a flexible beam pivoting on and supported at the end of the under foil 62 by an inner surface 64 of bushing 56 and at the free end of the over foil 60 by the next adjacent bearing foil 52. Under load, the individual bearing foils 52 tend to bend between the support points. The end of the under foil 62 will tend to slide on the inner surface 64 of the bushing 56 while the free end of the over foil 62 will slide over the next adjacent bearing foil 52. Movement of the bearing foils 52 will, however, be limited by the mounting bar 54 in the slot 58.

A foil support member 28A, similar to the foil support member 28 of FIGS. 5 and 6 may be utilized to provide stiffening for the under foil 62 in this bearing arrangement. The substantial difference between foil support members 28A and 28 lies in the length of the foil support member 28A being substantially co-extensive with the under foil 62 of the foil bearing element 50 so that contact with the surface 64 is actually with the end of the foil support member 28A. As in the foil bearing arrangement of FIG. 3, the foil support member 28A permits lighter, more flexible longer foils to be used for providing ideal fluid film shape for the bearing to optimize bearing performance while providing enhanced stiffening and damping operation by functioning initially in a bending mode and when bending is no longer possible functioning in a substantially purely compressive mode.

An alternative foil bearing element 70 is illustrated in FIG. 7 and includes a bearing foil 72 affixed to a mounting bar 74. On one side of the mounting bar 74 is a bearing foil portion 76. On the other side of the mounting bar 74 is a foil support portion 78. The under surface of the foil support portion 78 is preferably etched or grooved to alternately provide flat topped ridges 80 and grooves 82 and the top surface is also provided with alternate ridges 84 and grooves 86, the ridges 84 on the upper surface being spaced between the ridges 80 on the lower surface. By substituting the foil bearing element 70 for the foil bearing element 50 of FIG. 8, the desired stiffening and damping characteristic can be provided for the bearing without the need for any additional foil support member.

Figure 9:
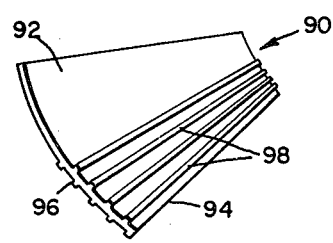
FIG. 9 illustrates a foil bearing element of this invention for use in a conical foil bearing.
Figure 2:
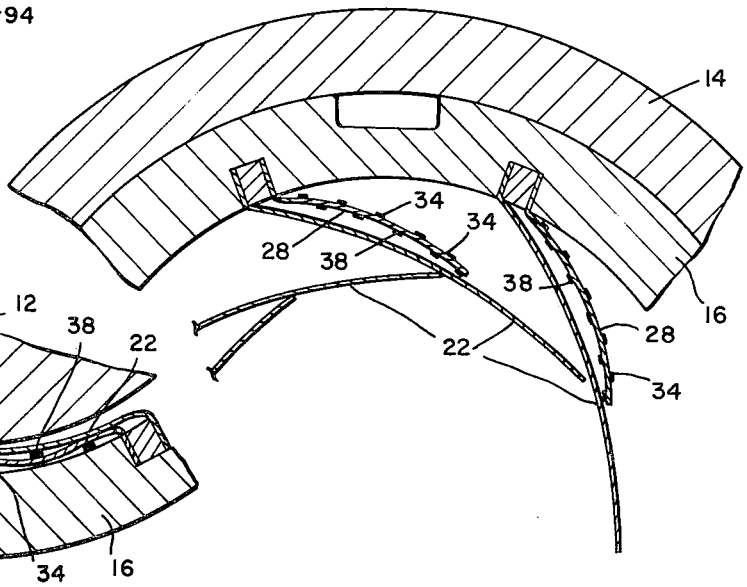
FIG. 2 is a partial sectional view of the bearing of FIG. 1.

It will be readily apparent that the foil support members made in accordance with this invention may be utilized in various bearing configurations either integrally formed with or separate from the foil bearing elements. FIG. 9 illustrates a foil bearing element 90 for a conical foil bearing having a bearing foil portion 92 and a foil support portion 94. Foil support portion 94 is provided with ridges 96 on its outer surfaces and ridges 98 on its top surface which alternate with the ridges 96 to provide the stiffening operation provided by foil support members in accordance with this invention.

While specific embodiments of the invention have been illustrated and described, it is to be understood that these are provided by way of example only and that the invention is not to be construed as being limited thereto but only the proper scope of the following claims.

We claim:

1. A method of supporting relative rotation between two members, one of which being supportive of the other, comprising the steps of:
    providing a plurality of compliant, overlapping foils between the two members;
    mounting each of said compliant foils with a first free end of each of said plurality of foils extending between said two members and overlapping an adjacent one of said plurality of foils; and
    fixedly mounting one end of a foil stiffening means on said one of said members for increasing the effective stiffness of each of said bearing foils by providing damping by bending as a beam in a first operative configuration and providing damping by bending in flexure in a plurality of beam segments in a second operative configuration.

2. The method of claim 1 wherein said foil stiffening means has inner surface protrusions abutting one of said bearing foils and outer surface protrusions abutting said one of said members in said second operative configuration and wherein:
    said foil stiffening means yields in response to compression between said bearing foil and said member.

3. The method of claim 1 wherein the step of mounting foil stiffening means comprises the steps of:
    establishing a plurality of alternating ridges and grooves along an outer surface and along an inner surface of a compliant member;
    aligning said ridges and grooves such that each outer surface ridge corresponds to an inner surface groove; and
    positioning said compliant member adjacent a compliant foil for mounting on said one of said members.

4. The method of claim 1 wherein each of said compliant foil includes mounting means and a second free end extending opposite said first free end from said mounting means and wherein the step of mounting foil stiffening means comprises the steps of:
    establishing a plurality of alternating ridges and grooves along an outer surface and along an inner surface of said compliant foil between said mounting means and said second free end; and
    aligning said ridges and grooves such that each outer surface ridge corresponds to an inner surface groove.

5. A method of supporting relative rotation between two members, one of which being supportive of the other, said method comprising the steps of:
    providing a plurality of compliant, overlapping foils between the two members;
    mounting each of said compliant foils with a first free end of each of said plurality of foils extending between said two members and overlapping a second free end of an adjacent one of said plurality of foils; and
    forming foil stiffening means on the second free end of each of said plurality of foils for increasing the effective stiffness of each of said bearing foils by providing damping by bending as a beam in a first operative configuration and providing damping by bending in flexure in a plurality of beam segments in a second operative configuration.

6. The method of claim 5 wherein said foil stiffening means has inner surface protrusions abutting the first free end of one of said bearing foils and outer surface protrusions abutting said one of said members in said second operative configuration and wherein:
    said foil stiffening means yields in response to compression between said bearing foil and said member.

7. The method of claim 5 wherein the step of forming foil stiffening means comprises the steps of:
    establishing a plurality of alternating ridges and grooves along an outer surface and along an inner surface of the second free end of a compliant foil; and
    aligning said ridges and grooves such that each outer surface ridge corresponds to an inner surface groove.

* * * * *